INVENTOR:
JOSEPH WINTER

United States Patent Office 3,496,625
Patented Feb. 24, 1970

3,496,625
COMPOSITE METAL ARTICLE
Joseph Winter, New Haven, Conn., assignor to Olin Mathieson Chemical Corporation, a corporation of Virginia
Application Mar. 30, 1966, Ser. No. 538,697, which is a continuation-in-part of application Ser. No. 520,404, Jan. 13, 1966, which in turn is a continuation-in-part of application Ser. No. 229,262, Oct. 2, 1962. Divided and this application Jan. 16, 1968, Ser. No. 719,811
Int. Cl. B21b 3/00; B32b 15/20
U.S. Cl. 29—199        4 Claims

---

ABSTRACT OF THE DISCLOSURE

The disclosure teaches a process for obtaining composite metal articles and the article obtained thereby wherein a first metal component has a recrystallization temperature under 500° F. and a second metal component has a recrystallization temperature at least 100° F. higher than the first metal component, with the components being rolled together in direct, face-to-face contact at a speed of at least 20 feet per minute in one pass at a reduction between 40 and 90%, with the first component only being recrystallized, thereby forming an integrated composite article.

---

Figure 1:
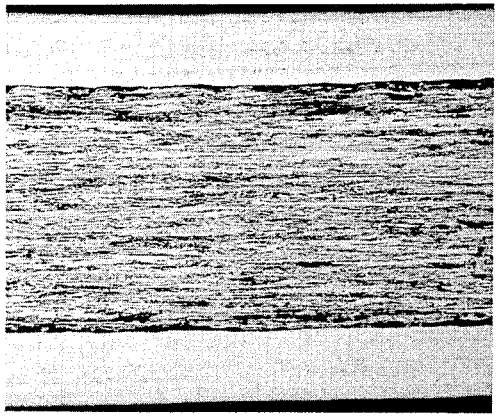

This application is a division of copending application Ser. No. 538,697, filed Mar. 30, 1966, now abandoned, which application is a continuation-in-part of U.S. patent application Ser. No. 520,404, filed Jan. 13, 1966, now abandoned which in turn is a continuation-in-part of U.S. patent application Ser. No. 229,262, filed Oct. 2, 1962, now abandoned.

The present invention relates to composite metal articles. More particularly, the present invention resides in composite metal articles wherein at least one component is a relatively soft metal, such as copper and at least one component is a relatively harder metal and to the process whereby said composites are obtained.

A particularly preferred embodiment of the present invention is those composites having a core of commercial purity copper clad on one or both sides with cupro-nickel, a copper base alloy containing about 75% copper and 25% nickel. This composite finds particular utility in the new United States coinage.

Composite articles having a dissimilar core and cladding and highly desirable commercially due to the fact that the beneficial characteristics of the core and cladding materials may be obtained in one composite article. In a single alloy frequently many properties cannot be greatly modified by alloying or thermal treatments, for example, such properties as modulus of elasticity, color, density, and strength in combination with high thermal or electrical conductivity. However, by forming composites apparent properties of the cladding can be generated while retaining the bulk properties of the core material. In this manner one can often obtain greatly modified and highly desirable properties over the single alloy.

For example, copper has the advantage of high conductivity and cold formability. By forming copper composites one can retain these desirable properties while generating properties of the cladding, such as wear resistance, color, oxidation or tarnish resistance and fine finishing, i.e., surface quality.

Various uses to which composite copper articles may be put are as follows: high conductivity, high strength springs; highly efficient electrical contactors; hardware involving extensive cold forming.

However, the preparation of composite copper articles presents numerous practical problems. It has been difficult to produce a satisfactory composite article wherein at least one of the components is copper or a copper base alloy due to the tendency of one of the components to form a layer of brittle intermetallic compounds at the interface with the copper component. This layer may form at moderate temperatures or at elevated temperatures. The brittle layer of intermetallic compounds which so forms may shatter readily on flexing of the composite material, thus clearly limiting the usefulness of the composite.

In addition, it is frequently difficult to obtain a well bonded composite article which will withstand normal expected use.

Copper presents further and peculiar problems in the formation of composites due to the tendency of copper to oxidize at the moderate or elevated temperatures necessary for hot rolling. This oxidation will produce an interference oxide layer which inhibits bonding. Some copper oxides are particularly difficult as they form a strongly adherent, plastic layer which greatly interferes with bonding. Other oxides, on the other hand, tend to break up on hot rolling, for example, aluminum oxides and iron oxides, thus not forming an interference layer.

The tendency of copper to form this peculiar oxide has necessitated special and expensive treatment conditions in order to form copper composites.

One method of forming copper composites in order to overcome these difficulties is to form a partial bond by cold rolling followed by subsequent diffusion anneals. This is an expensive process and the diffusion anneals tend to degrade the properties of the composite.

One highly effective method for overcoming the foregoing disadvantages is found in co-pending application Ser. No. 229,262. This method is also described in co-pending application Ser. No. 454,182, filed May 7, 1965. In general, the foregoing co-pending aplications critically control certain variables and thereby obtain a highly convenient and expeditious process which results in a greatly improved composite article. In these processes the copper base alloy core only is heated to an elevated temperature followed by rolling together the heated core and the cold cladding at high speed of at least 100 feet per minute in one pass at a specified reduction with the core and cladding coming together for the first time in the bite of the rolls, with the cladding contacting the roll prior to contacting the core.

The processes described in the foregoing applications readily obtain an excellent bond due to the therein described critical conditions and due to the high temperature of the core with respect to the cladding. This results in an exaggerated difference in ductility between the core and cladding. The processes of said co-pending applications also result in turbulence at the interface of the core and cladding, which turbulence promotes bonding between the components. The difference in ductility and generated turbulence is sufficient to overcome oxide build up by breaking up the oxide.

It would be highly desirable if a process could be devised which would achieve the improved results of said co-pending applications and result in a convenient, commercially feasible and expeditious process for bonding this type of material. It would be highly desirable if this process could be devised without the practical difficulties attendant upon the use of elevated temperatures which characterizes the processes of sad co-pending applications. It would be highly desirable if a process were devised which enables the use of lower temperatures.

Accordingly, it is a principal object of the present invention to provide new and improved composite articles and convenient and expeditious processes whereby said composite articles are obtained.

It is a further object of the present invention to provide a process and article as aforesaid whereby the articles are characterized by having high strengths, excellent physical properties and suitable for a wide variety of uses.

It is a further object of the present invention to provide a process and article as aforesaid wherein one component of the composite is relatively soft with respect to the other, in particular, composite articles having a copper core and a dissimilar cladding.

It is a still further object of the present invention to provide a process and article as aforesaid which overcomes the numerous limitations and disadvantages attendant upon the formation of conventional composite articles.

Still further objects and advantages of the present invention will appear from the ensuing discussion.

In accordance with the present invention, it has now been found that the foregoing objects and advantages may be readily obtained. The process of the present invention readily overcomes the disadvantages of the art and achieves a simple and convenient process for obtaining a highly useful composite article clad on either one side or both sides. The process of the present invention is a process for obtaining a composite article having a metal core, clad with a dissimilar metal which comprises: (A) providing a first metal component of the composite having a recrystallization temperature under 500° F., preferably copper or a copper base alloy; (B) providing a second metal component of the composite having a recrystallization temperature at least 100° F. higher than said first component; (C) rolling together said components in direct, face-to-face contact at a speed of at least 20 feet per minute in one pass at a reduction between 40 and 90%, said reduction being sufficient to cause said first component only to recrystallize, thereby forming an integrated composite article. This recrystallization may occur either in the bite of the rolls or immediately upon exit from the rolls.

In the preferred embodiment, the softer component, i.e., the component having a recrystallization temperature under 500° F., is the core and the second component is the cladding. It is also preferred that the core and cladding come together for the first time in the bite of the rolls.

By "recrystallize" it is meant the presence of metallographically visible, equiaxed grains of unstressed material throughout at least 25 percent of the surface area being metallographically examined. By "recrystallize" it is also meant the decrease in hardness of the material being recrystallized by at least 25 percent of the difference in hardness between material fully hardened by cold working and material fully thermally softened.

The theory behind the process of the present invention is as follows. The higher the deformation or the reduction of the composite in the rolls, the more heat is imparted to the composite, i.e., a rolling reduction of for example 75% will cause the composite to heat up to a greater degree than a rolling reduction of for example 40%. If an appropriate reduction is chosen to cause one of the components to recrystallize by imparting a certain level of heat and residual work to the composite, than that component which is being recrystallized is undergoing hot rolling and it is getting softer during the rolling than the other component, i.e., the component which is not being recrystallized is getting relatively harder during the rolling. This exaggerated difference in ductility between the core and cladding results in turbulence at the interface between the core and cladding which turbulence promotes bonding.

Naturally, recrystallization is a time and temperature dependent phenomenon. Therefore, recrystallization does not spontaneously occur throughout the component being recrystallized. Recrystallization occurs over a finite period of time which depends upon the percentage rolling reduction and the temperature attained in the bite of the rolls. The higher the temperature achieved in the bite, the faster the rate of recrystallization.

Accordingly, in accordance with the present invention the process for recrystallization has started in the bite of the rolls, and recognizable recrystallization has occurred at least within seconds after exit from the rolling mill. The exact distance from the mill will depend upon rolling speed.

The resultant composite is characterized as follows: one component exhibits a microstructure of at least 25 percent, preferably at least 50 percent, equiaxed, recrystallized grains, i.e., the micro-grain structure contains grains spheroidal in nature with the axis of each grain being substantially the same. This is caused by the nucleation and growth of unrestrained grains which consume strained material. The micro-grain structure of the other component is grossly elongated in the rolling direction, with the length to thickness ratio of the elongated grains being at least 2:1. The core and cladding are characterized by a direct, face-to-face bond with the absence of oxide between core and cladding, i.e., little or no apparent oxide between the core and cladding. In addition, the interface between the core and cladding is characterized by the absence of apparent atomic interdiffusion, with said interface being further characterized by having at least 10% greater surface contact area than planar sheets.

In the preferred embodiment, upon entering the rolls, an angle is provided between the core and cladding in excess of 5°, and generally in excess of 10°, in order to insure that the core and cladding will not come together earlier than in the bite of the rolls. This is not essential, however. Generally, the included angle between the core and cladding is between 5 and 22°.

In accordance with the preferred embodiment of the present invention, the cladding metal contacts the roll prior to contacting the core. This is true whether the core is to be clad on one side or both sides. On the front side of the rolls (entering side) the cladding and the rolls are travelling at different linear speeds; whereas, at the exit side they are going at the same speed due to the reduction in thickness of the composite. The difference in travelling speeds between the cladding and the rolls, coupled with the pre-contact between the cladding and the rolls, coupled with atomic movement inherent in the recrystallization of the core, generates a shearing strain to the core-clad interface. This shearing strain at the coreclad interface results in turbulent flow of metal at the interface which causes an intimate bonding and increases the interfacial linear surface of the composite by generally 20% or more.

It has been found that the simple process delineated above achieves a highly advantageous composite article, with the interface between the core and cladding characterized as indicated hereinabove. The composite articles of the present invention have excellent physical properties, very high bond strengths and the absence of atomic interdiffusion between base metal and cladding, which interdiffusion may result in the formation of brittle compounds. The present invention achieves these surprising advantages by means of a simple and convenient process and without the use of expensive devices such as are frequently employed in the art.

In accordance with the present invention, at least one component of the composite must have a recrystallization temperature under 500° F. and another component of the composite must have a recrystallization temperature at least 100° F. higher than said first component.

By recrystallization temperature it is meant the minimum temperature at which recrystallization of cold worked metal occurs within a specified time; nominally, cold worked infers at least 50% cold work.

In the preferred embodiment, the component with the lower recrystallization temperature is the core material. Therefore, the present invention will be discussed in more detail with this preference in mind. It should be understood, however, that either component may be employed as the core material. Preferably, copper or a copper base alloy is the core material. Representatives copper base alloy materials with recrystallization temperatures lower than 500° F. are as follows: Commercial purity copper, various high conductivity grades of copper with conductivities in excess of 50% IACS. Alternatively the core material may be a low temperature melting material as lead, tin, zinc, aluminum or alloys thereof.

The core material is preferably provided in plate form having a thickness less than ½ inch, i.e., the core material may be provided in coils, strip, sheet or the like form.

It is preferred, but not required, in accordance with the present invention to mechanically roughen the bonding surfaces of both the core and the cladding materials in order to assure good surface contact at the bite of the rolls. For example, the surfaces may be wire brushed or abraded, etc.

The cladding material must have a recrystallization temperature of at least 100° F. higher than the chosen core material and preferably at least 300° F. higher than the core material. The differential of recrystallization temperatures between the core and cladding are, of course, provided in order to insure that both components do not recognizably recrystallize as defined above.

The cladding material may be, for example, a copper base alloy or base alloy or lead, tin, nickel, zinc, titanium, iron, silver or aluminum. Naturally, the present invention contemplates cladding the copper core on both sides with dissimilar metals on each side.

The cladding material should be in plate form less than ¼ inch in thickness, i.e., the cladding and the core material should be in wrought form, for example, coils of strip, sheet, etc. Therefore, the resultant composite has a thickness less than 0.60 inch where the copper is clad on two sides and less than 0.45 inch where it is clad on one side. The lowest gage materials, both core and cladding, which can be conveniently worked with, is on the order of 0.001 inch.

The starting materials, both core and cladding, can be in any temper or condition, hard or soft as long as the foregoing requirements concerning recrystallization temperature relationships are met. In the preferred embodiment the core should be in a cold worked temper and cladding in an annealed temper as this exaggerates the recrystallization temperature differential.

Surface oxides, unless very massive, are generally no handicap to the process of the present invention. This is quite surprising and is a significant advantage of the present invention since conventional processing must remove surface oxides prior to the formation of the composite. In fact, conventional processing frequently forms composites in special atmospheres so that one does not form surface oxides prior to the formation of the composite. These special precautions are not required in the present invention.

It is, however, highly desirable to remove dirt or adhering lubricant from the surface of the metal prior to the process of the present invention in order to assure good frictional contact between the core and the cladding materials. Any conventional cleaning processes may be readily employed, for example, the core and cladding materials may be passed through a soap or a detergent solution in accordance with conventional procedures. Examples of such cleaning procedures include the use of commercial alkaline cleaners and solvent cleaners, such as carbon tetrachloride and trichlorethylene.

It is a surprising feature of the present invention that it desired the core and cladding may be integrated without heating either one or both of the components, or at most with only moderate heating of the core. This is a particular advantage of the present invention. For example, if the core is commercial purity copper and the cladding is 75:25 cupro-nickel, the core recrystallizes at about 375° F. within minutes and the cladding recrystallizes at about 1000° F. Thus, if the core and cladding are both rolled without heating the core, the one pass reduction must be high in order to recrystallize the core as a result of rolling, i.e., the one pass reduction must be at least 81 to 90%. If it is desired to take a lesser degree of reduction on the composite, the core should be heated somewhat, for example, from 200 to 275° F. which necessitates a rolling reduction of from 70 to 80% in order to recrystallize the core as a result of rolling. Alternatively, the core may be in a cold worked temper, e.g., 3 to 50% cold worked in which case recrystallization would occur with a 70 to 80% rolling reduction and without the use of auxiliary or prior heating. If desired, rolling conditions can be arranged to cause the core material to attain a temperature in excess of 375° F., thereby causing recrystallization, e.g., control of lubricant, rolling speed, etc. Naturally, due to the high recrystallization temperature of the cupro-nickel cladding, the small amount of heat imparted to the composite in the rolling step will not recrystallize the cupro-nickel.

In accordance with the present invention it is preferred that the core and cladding enter the rolls at an angle so that they come together for the first time in the bite of the rolls. The materials are rolled at a high speed of at least 20 feet per minute in one pass with a reduction between 40 and 90%, with these variables in general being governed by the particular core, by its recrystallization temperature and by its temperature entering the rolls. In the preferred embodiment the materials are rolled at 60–300 feet per minute with a reduction between 70 and 85%. The copper core should preferably be maintained between room temperature and 275° F. upon entering the rolls, depending upon the degree of cold work. The greater the cold work, the lower the allowable temperature.

It is preferred that the core and cladding enter the rolls at an angle in excess of 10° and generally at an included angle of between 5° and 22° in order to assure that the core and cladding will not come together earlier than at the bite of the rolls and in order to put as much shear as possible at the interface. The shear at the interface enables the provision of at least 10% increased surface area than between the plan materials, i.e., the interface between the core and cladding is characterized by a wave-like formation with a significant increased interfacial contact area. It is further noted that the interfacial surface betwen the core and cladding is characterized by the absence of apparent interatomic diffusion between the core and cladding material. For example, when an aluminum alloy cladding is used, there is substantially no diffusion of aluminum atoms into the copper core and no apparent formation of deleterious Cu-Al intermetallic compounds.

A further advantage of the present invention is that subsequent to the rolling operation the composites of the present invention do not require subsequent diffusion anneals, i.e., conventional processing frequently requires diffusion anneals to secure the bond between core and cladding. The fact that the present invention does not require diffusion anneals is particularly significant since diffusion anneals might and frequently do cause blisters or the like due to the long treatment times required and co-diffusion of gases to the interface between the core and cladding. Diffusion anneals also promote the formation of deleterious intermetallic compounds.

In fact, subsequent to the rolling operation no further operations whatever are required. The composites of the present invention are provided in commercial form ready to be used for the desired application. It may naturally be desirable to perform conventional subsequent operations for particular applications. For example, short thermal treatments for stress relief or the attainment of desired properties, e.g., a short heat treating anneal or aging treatment, a rolling operation for dimensional control, additional work hardening, and so forth.

The present invention will be more readily understandable from a consideration of the following illustrative examples.

EXAMPLE I

In the following example the core was clad on both sides, the core material was an electrolytic, commercial purity copper alloy containing 99.9% copper in strip form having a gage of 0.160" and the cladding material was a copper base alloy containing about 75% copper and 25% nickel at a gage of 0.045". All of the processing of these materials was conducted in air.

Both the core and the claddings were in the fully annealed condition; therefore, both the core and claddings were in the recrystallized condition.

Both the core and claddings were cleaned in an alkaline detergent solution, rinsed with warm water, dried with warm dry air and the surfaces of the core and claddings abraded with a rotating wire brush.

The core and claddings were then rolled together at room temperature (approximately 78° F.) with no prior heating to either the core or claddings. The speed of the rolls was 40–150 feet per minute using a continuous, variable speed rolling mill. The materials were rolled in one pass at a reduction of 80%. The included angle between claddings was 12° with the core bisecting this. The core and claddings came together for the first time in the bite of the rolls, with the claddings contacting the rolls prior to contacting the core.

The resultant composite is shown in FIGURE 1 at a magnification of 65×. The composite was characterized by having a moderate bond strength, with a peel strength of from 40 to 60 pounds. The peel strength is a measure of the strength of the bond and is determined on a ¾" wide specimen wherein the cladding is directly peeled from the core. The peel strength is a measure of the force necessary to pull the composite apart. The higher the peel strength the better the bond.

The resultant composite was about 0.050" thick. Examination of FIGURE 1 shows (1) there was no apparent interatomic diffusion between claddings and core and (2) there was at least 10% greater bonding area at the interface than with planar materials, with the intersurface being characterized by a moderate wave-like formation. It is also apparent from an examination of FIGURE 1 that neither the core nor claddings were recrystallized. This is apparent from the elongated grain structure in FIGURE 1 shown in both the core and claddings.

EXAMPLE II

In this example the same core and claddings as Example I were used, with the core being clad on both sides. The starting materials were of the same gage as in Example I, with all processing being conducted in air.

Both the core and claddings were in the fully annealed condition and both the core and claddings were cleaned, dried and abaded as in Example I.

After the cleaning and abrading, the core only was placed in a furnace and heated to 250° F. The core and claddings were then rolled immediately after the core exited from the furnace with the cladding materials being rolled cold. The materials were rolled in one pass with the rolling variables being the same as Example I.

Figure 2:
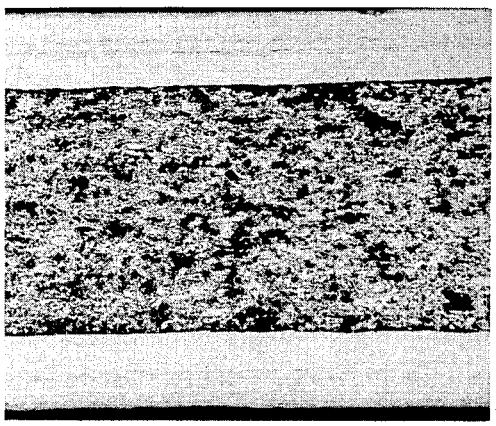

The resultant composite is shown in FIGURE 2 at a magnification of 65×. The composite was characterized by having a good bond strength, with a peel strength in excess of 90 pounds.

Examination of FIGURE 2 shows (1) there was no apparent interatomic diffusion between claddings and core and (2) there was at least 10% greater bonding area at the interface than with planar materials, with the intersurface being characterized by a moderate wave-like formation. It is also apparent from FIGURE 2 that the claddings were not recrystallized while the core was recrystallized. It should be noted that after heating the core to 250° F., the core was still in the recrystallized condition; however, in the bite of the rolls the core material was continually being cold worked and the 80% reduction allowed the recrystallization process to start in the bite of the rolls.

EXAMPLE III

Example I was repeated except that the core material was cold worked 11% prior to rolling; therefore, the core material was not recrystallized as it entered the rolls.

Figure 3:
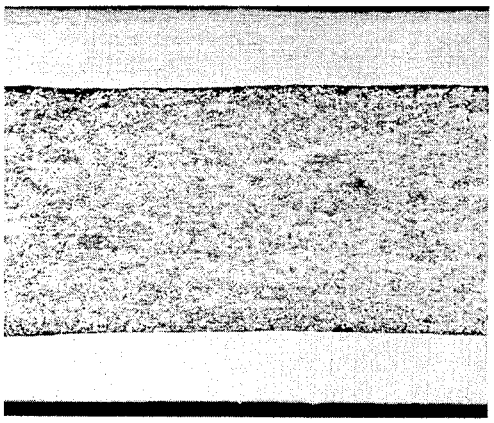

The resultant composite is shown in FIGURE 3 at a magnification of 65×. The composite was characterized by having a good bond strength, with a peel strength in excess of 90 pounds.

Examination of FIGURE 3 shows (1) there was no apparent interatomic diffusion between claddings and core and (2) there was at least 10% greater bonding area at the interface than with planar materials, with the intersurface being characterized by a moderate wave-like formation. It is also apparent from FIGURE 3 that the claddings were not recrystallized while the core was recrystallized. The core was not recrystallized as it entered the rolls, but the 80% reduction taken was sufficient to cause recrystallization of the core material since the core had been given 11% prior cold work.

EXAMPLE IV

Example I was repeated with a core of super-purity aluminum and claddings of stainless steel. The aluminum core was in the cold worked, H–14 temper. The core and claddings were rolled together as in Example I with a one pass reduction of 60%.

The resultant composite was characterized by good bond strength as in Examples II and III, with good physical properties comparable to Examples II and III. The claddings were not recrystallized, while the core was recrystallized.

EXAMPLE V

Example II and III were repeated, except that the claddings were commercial cartridge brass having 70% copper and 30% zinc.

The resultant composites had characteristics comparable to those in Examples II and III with peel strengths in excess of 90 pounds. The claddings were not recrystallized, while the core was recrystallized.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning of the range of equivalency are intended to be embraced therein.

What is claimed is:

1. An integral composite article having a core clad with a dissimilar metal, said article having a thickness less than 0.60 inch with the interface between the core and cladding being characterized by the absence of atomic interdiffusion, with said interface being further characterized by having at least 10% greater surface contact area than planar sheets, with one component of the composite exhibiting a microstructure of at least 25% equiaxed grains and another component having grains grossly elongated in the rolling direction, with the length to thickness ratio of said elongated grains being at least 2:1, said core and cladding being in direct face-to-face contact.

2. A composite article according to claim 1 wherein said component with a microstructure of equaxed grains being the core.

3. A composite article according to claim 2 wherein said core is a copper base alloy.

4. A composite article according to claim 3 wherein said cladding is cupro-nickel.

(References on following page)

References Cited

UNITED STATES PATENTS

| | | | |
|---|---|---|---|
| 2,691,815 | 10/1954 | Boessenkool et al. | 29—194 X |
| 2,753,623 | 7/1956 | Boessenkool et al. | 29—194 X |
| 2,767,467 | 10/1956 | Siegel | 29—194 X |
| 3,165,829 | 1/1965 | Wardlaw | 29—497.5 X |

L. DEWAYNE RUTLEDGE, Primary Examiner

G. K. WHITE, Assistant Examiner

U.S. Cl. X.R.

29—194

PO-1050
(5/69)

UNITED STATES PATENT OFFICE
CERTIFICATE OF CORRECTION

Patent No. 3,496,625            Dated February 24, 1970

Inventor(s) Joseph Winter

It is certified that error appears in the above-identified patent and that said Letters Patent are hereby corrected as shown below:

In Column 1, line 48, the word "and" should read --are--.

In Column 2, line 66, the word "sad" should read --said--.

In Column 3, line 64, the word "hat" should read --hot--.

In Column 4, line 16, the word "unrestrained" should read --unstrained--.

In Column 5, line 68, the word "it", second occurrence, should read --if--.

In Column 6, line 43, the word "plan" should read --planar--;

In Column 6, line 47, the word "betwen" should read --between--.

In Column 7, line 56, the word "abaded" should read --abraded--.

In Column 8, line 39, the word "Example" should read --Examples--;

In Column 8, line 68, the word "equaxed" should read --equiaxed--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents